Figure 3:
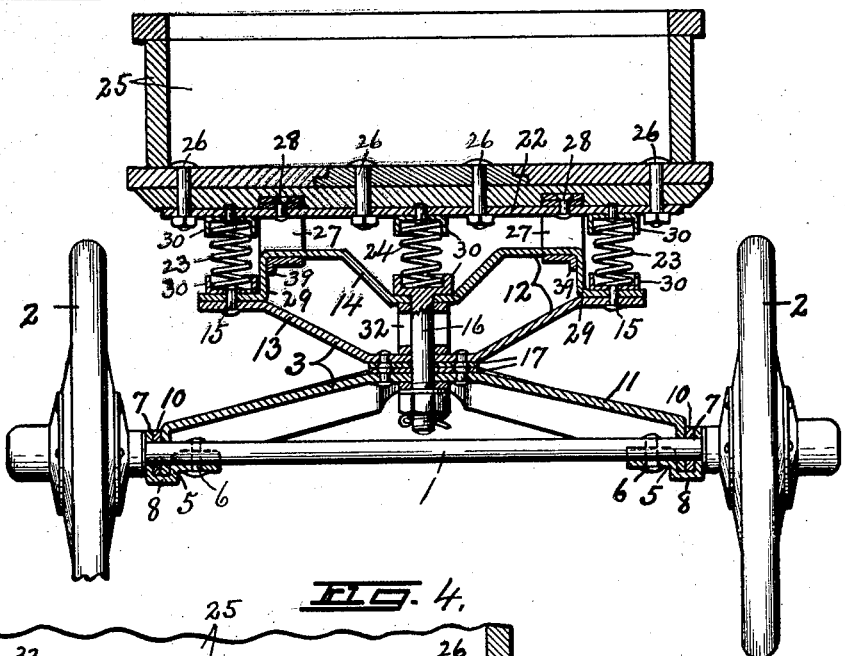

Sept. 23, 1924.
H. W. SHERWOOD
CART
Filed Nov. 2, 1923 2 Sheets-Sheet 1
1,509,181
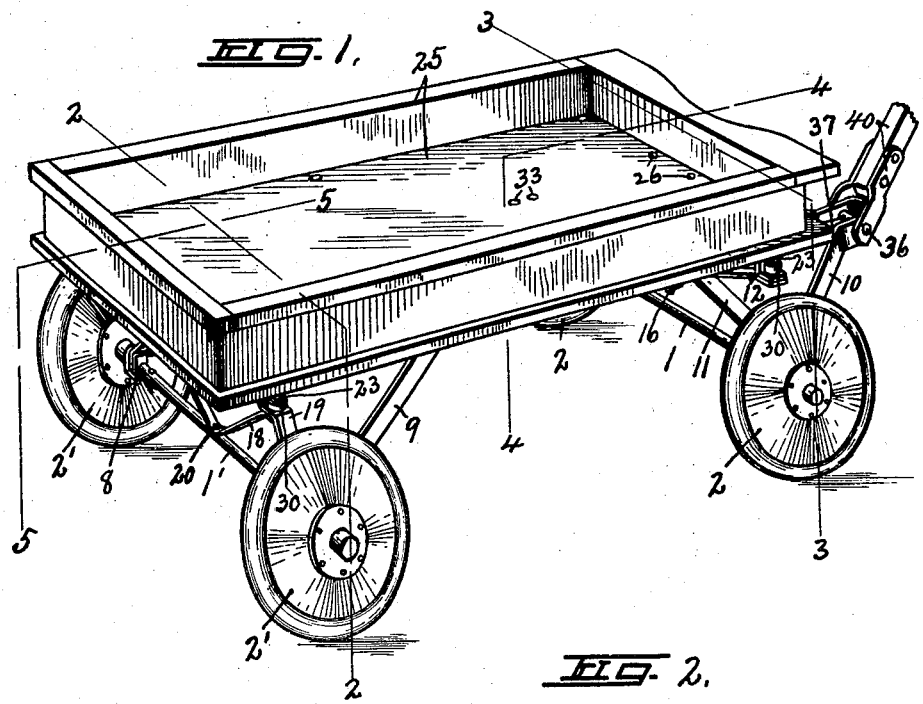
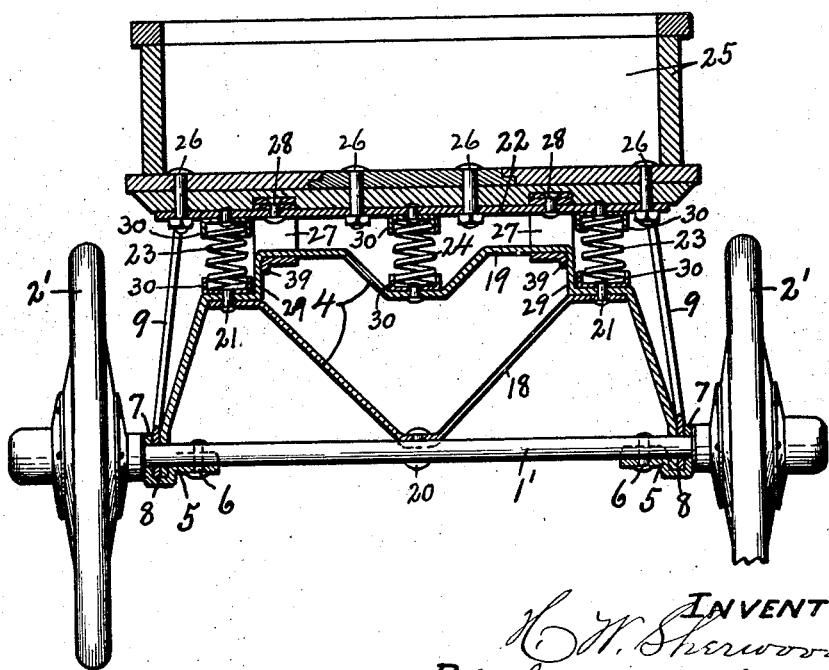

Sept. 23, 1924. 1,509,181
H. W. SHERWOOD
CART
Filed Nov. 2, 1923 2 Sheets-Sheet 2

INVENTOR
H. W. Sherwood
BY
ATTORNEY

Patented Sept. 23, 1924.

1,509,181

UNITED STATES PATENT OFFICE.

HOWARD W. SHERWOOD, OF SYRACUSE, NEW YORK, ASSIGNOR TO EDNA I. SHERWOOD, OF AUBURN, NEW YORK.

CART.

Application filed November 2, 1923. Serial No. 672,281.

*To all whom it may concern:*

Be it known that I, HOWARD W. SHERWOOD, a citizen of the United States of America, of Syracuse, in the county of Onondaga, in the State of New York, have invented new and useful Improvements in Carts, of which the following, taken in connection with the accompanying drawings, is a full, clear, and exact description.

This invention relates to carts preferably of the four-wheel type adapted to be drawn by hand or may used for coasting and other purposes to which it may be put, and refers more particularly to the connections between the body and axles.

These carts are commonly used by children and therefore, must be strong and durable in order to permit them to be used with ease and safety, and the main object of my present invention is to provide a construction which will assure these advantages, and at the same time increase the riding qualities of the cart.

One of the specific objects is to provide both front and rear axles with washer-plates which serve the double purpose of limiting stops for the inner ends of the hubs and also as seats for the ends of the bolsters.

Another specific object is to provide the body supporting bars with loops slidably embracing portions of the underlying bolsters for permitting and limiting relative movement between the body and bolsters.

A further object is to provide resilient connections between the cross bars and bolsters for yieldingly supporting the body.

Other objects and uses relating to specific parts of the cart will be brought out in the following description.

In the drawings:

Figure 1 is a perspective view of a hand cart embodying the various features of this invention.

Figures 2 and 3 are enlarged transverse vertical sections taken respectively on lines 2—2 and 3—3, Figure 1.

Figure 4:
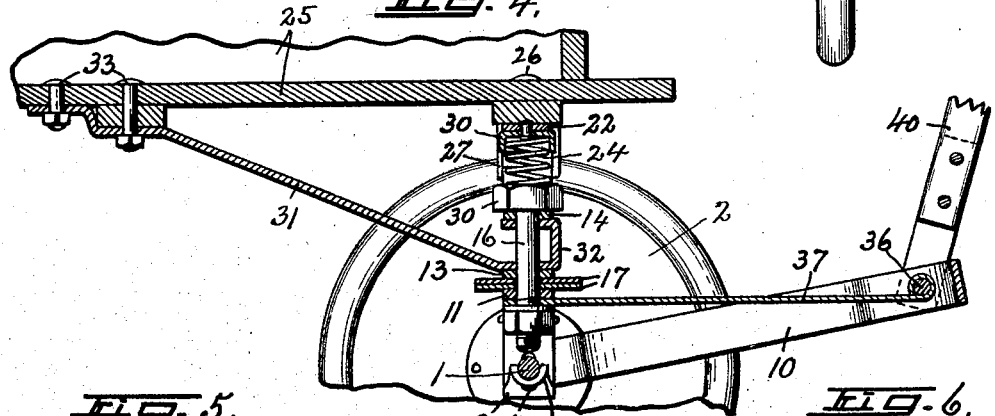
Figures 5, 6:
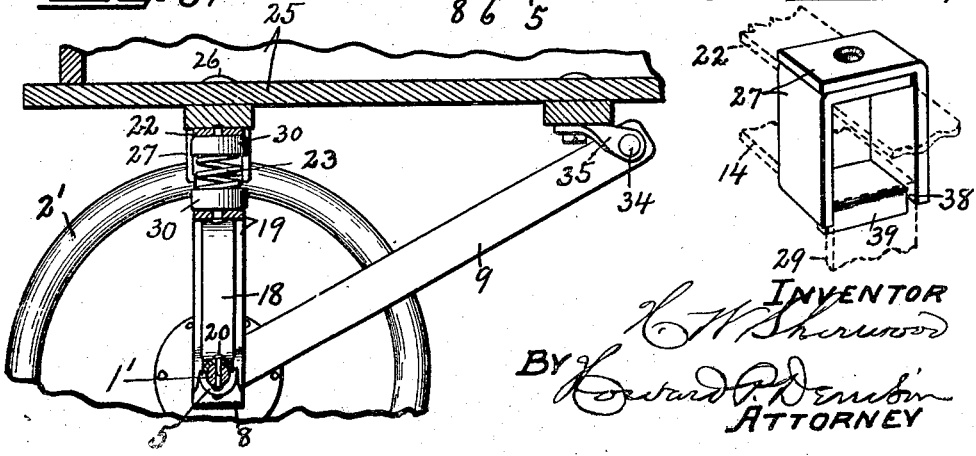

Figures 4 and 5 are further enlarged longitudinal sectional views through the front portion and rear portion of the cart taken respectively on lines 4—4 and 5—5, Figure 1.

Figure 6 is a perspective view of one of the detached guide loops enlarged and showing by dotted lines, portions of the cross bar and underlying bolster.

As illustrated, this cart comprises front and rear axles —1— and —1'— having suitable supporting wheels —2— and —2'— journaled thereon, the front axle being provided with a sectional bolster —3— while the rear axle is provided with a unitary bolster —4—.

Each of the axles —1— and —1'— is provided with a pair of washer plates —5— secured at one end of the underside thereof by rivets —6— and having their outer ends embracing their respective axles to form stop washers —7— for engaging the inner ends of the hubs of corresponding wheels and limiting their inward movement, the intermediate portion of each plate being depressed below the axle to form pockets —8— for the reception of the adjacent ends of the overlying bolsters, the rear pockets being adapted to receive the adjacent ends of the forwardly extending brace bars —9— while the front pockets in addition to receiving the ends of the bolster —3— serve also to receive the adjacent ends of a forwardly projecting yoke or hound —10—.

The front bolster —3— comprises a lower section —11— and an upper section —12—, the lower section being arched upwardly from the ends toward the center and its ends provided with downwardly projecting apertured lugs seated in the sockets —8— and embracing the adjacent portions of the axle —1—.

The upper bolster section —12— is somewhat shorter than the lower section —11— and is composed of a lower strap section —13— and an upper strap section —14—, the lower section —13— being arched downwardly from its ends toward the center while the upper section —14— is secured at its ends by rivets —15— to the corresponding ends of the lower section —13— as shown in Figure 3.

The central portions of the lower bolster section —11— and upper bolster section —12— are pivoted to each other by a king bolt —16— and are provided with interposed wearing plates or washers —17— which together with a king bolt, constitutes what may be termed a fifth-wheel connection between the sections —11— and —12—.

The rear bolster —4— comprises a V-shaped section —18— and an inverted U-shaped section —19—, the apex of the section —18— being secured by a bolt or rivet —20— to the central portion of the axle —1'— while the ends of the section —18— are disposed in horizontal planes and are secured by rivets —21— to overlie horizontal portions of the section —19— as shown in Figure 2.

A pair of body supporting cross bars —22— are yieldingly supported by opposite end and intermediate coil springs —23— and —24— directly over the front and rear bolsters —3— and —4— for receiving and supporting a superposed body —25— having its bottom removably secured to said cross bars by bolts —26— or equivalent fastening means.

Each of the cross bars —22— is provided with a pair of guide loops —27— rigidly secured thereto by rivets —28— and slidably embracing horizontal portions of the upper bar of the underlying bolster as —3— or —4— between the end springs —23— and intermediate spring —24— and are also slidably engaged with upright portions —29— of their respective bolsters to assist in holding the body against undue lateral movement relatively to the bolsters and axles.

That is, the guide loops —27— of each pair embrace the adjacent portions of the corresponding bars —22— and the top bar of the underlying bolster leaving a normally open space between said bars for relative vertical movement of the body and bolsters against and with the action of the springs —23— and —24— which are tensioned to normally hold the lower ends of the guide loops against the undersides of the top bars of the bolsters.

These guide loops not only serve to guide the body in its vertical movement but also serve to limit the upward and lateral movement of the body relatively to the bolsters.

It will be observed that the bars —22— are assembled with the bolsters thus permitting the body —25— to be bolted to the bars after the other parts of the cart have been assembled.

It will also be observed that the portions of the bolsters upon which the springs —23— and —24— are seated are depressed below the remaining portions of their upper bars —14— and —19— to afford a more convenient means for receiving the spring seats.

The lower and upper ends of the springs are seated in suitable sockets —30— on the undersides of the cross bars —22— and underlying faces of the top bars —14— and —19— of the front and rear bolsters, the lower socket for the intermediate front bolster being preferably formed in the head of the king bolt —16— as shown in Figure 2.

A central longitudinally extending brace bar —31— is provided with an L-shaped front end —32— interposed between the central portions of the bars —13— and —14— of the upper front bolster section —12— and embraces the king bolt —16— for additionally bracing the upper bolster section —12— and king bolt —16—, the rear end of said brace being secured by bolts —33— to the underside of the bottom of the box —25—, Figure 4.

The brace bars —9— extending forwardly from the rear axle —1'— are secured by pivotal bolts —34— to suitable clips —35— on the underside of the bottom of the box —25—, Figure 5.

The yoke or hound —10— is preferably Y-shaped and arranged with its smaller end extending forwardly and upwardly from the front pockets —8—. A tongue or handle —35— is pivotally secured by a bolt —36— to the front end of the yoke which in turn is held against undue vertical movement by a central lengthwise bar —37— having its forward end connected to the bolt —36— and its rear end connected to the king bolt —16— directly under the central portion of the lower front bolster section —11—, as shown in Figure 4.

It will be observed upon references to Figure 6 that the outer edges of the bottoms of the guide loops —27— are deflected downwardly to form recesses —38— and vertical abutments —39—, thus permitting the front and rear walls of the guide loops to engage the corresponding edges of the upright portions —29— of the bolster bars —14— and —19— to prevent relative forward and rearward movement of the guide loops and bolsters, while the abutments —39— ride agianst the inner faces of said upright portions —29— to hold the loops and bolsters against relative lateral movement.

By constructing the cart in the manner described, the entire running gear including the bolsters —3— and —4—, body supporting bars —22— and springs —23— and —24— together with the loops —27— may be made up as a single unit while the body may be made as another unit and readily clamped to the cross bars by means of the bolts —26— and also to the braces —9— and —31— by means of the bolts —34— and —33—.

The construction is also designed for lightness, strength and durability with relatively small number of parts, all of which enables the cart to be produced at a comparatively low cost while at the same time increasing its working efficiency and safety.

I claim:

1. In a cart having an axle and supporting wheels journaled thereon, washer-plates secured to the axle adjacent the inner ends of the wheel hubs and provided with bolster-receiving pockets, and a body supporting bolster overlying the axle and having its opposite ends seated in the adjacent pockets and embracing the adjacent portions of the axle.

2. In a cart having front and rear axles and supporting wheels journaled thereon, washer-plates secured to the rear axle adjacent the inner ends of the rear wheel hubs and provided with bolster-reciving pockets, a body supporting bolster overlying the rear axle and having its opposite ends seated in the adjacent pockets and embracing the adjacent portions of the rear axle, and forwardly extending body braces having their rear ends seated in said pockets and embracing the adjacent portions of the rear axle.

3. In a cart having front and rear axles and supporting wheels journaled thereon, washer-plates secured to the front axle adjacent the inner ends of the front wheel hubs and provided with bolster-receiving pockets, a body supporting bolster overlying the front axle and having its opposite ends seated in said pockets and embracing the adjacent portions of the front axle, and a forwardly extending tongue-supporting yoke seated in said pockets and embracing the adjacent portions of the front axle.

4. In a cart having front and rear axles and supporting wheels journaled thereon, washer-plates secured to the axles adjacent the inner ends of the hubs of the wheels and privided with bolster-receiving pockets, and front and rear body supporting bolsters overlying the corresponding axles and having their opposite ends seated in the adjacent pockets and embracing the adjacent portions of the axles.

5. In a cart having front and rear axles and supporting wheels journaled thereon, washer-plates secured to the axles adjacent the inner ends of the hubs of the wheels and provided with bolster-receiving pockets, front and rear body supporting bolsters overlying the corresponding axles and having their opposite ends seated in the adjacent pockets and embracing the adjacent portions of the axles, forwardly extending body supporting braces having their rear ends seated in the rear pockets and embracing the adjacent portions of the rear axle, and a tongue or hound having its rear end seated in the front pockets and pivotally embracing the adjacent portions of the front axle.

6. In a cart having front and rear axles and supporting wheels journaled thereon, bolsters mounted on the front and rear axles and each provided with a pair of horizontal portions and a pair of vertical portions, body supporting bars overlying the bolsters, and resilient connections between the bars and their respective bolsters, each bar being provided with a pair of guide loops secured thereto and slidably embracing the horizontal portions of the corresponding bolster and also slidably engaging the vertical portions of said bolster.

7. In a cart having front and rear axles and supporting wheels journaled thereon, a bolster composed of lower and upper sections centrally journaled one upon the other for relative horizontal turning movement, the lower section being mounted directly upon the front axle, a cross bar overlying the upper bolster section, yielding connections between the bar and upper bolster section, and guide loops secured to the bar and slidably embracing portions of the upper bolster section to permit and limit relative vertical movement between said bar and upper bolster section.

In witness whereof I have hereunto set my hand this 23rd day of October, 1923.

HOWARD W. SHERWOOD.

Witnesses:
 H. E. CHASE,
 RITA CAMPOLIETO.